(12) United States Patent
Kokubo

(10) Patent No.: US 10,042,594 B2
(45) Date of Patent: Aug. 7, 2018

(54) IMAGE PROCESSING APPARATUS AND METHOD, AND NON-TRANSITORY COMPUTER READABLE MEDIUM

(71) Applicant: FUJI XEROX CO., LTD., Tokyo (JP)

(72) Inventor: Taiga Kokubo, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/446,446

(22) Filed: Mar. 1, 2017

(65) Prior Publication Data

US 2018/0032295 A1 Feb. 1, 2018

(30) Foreign Application Priority Data

Jul. 27, 2016 (JP) ................................ 2016-147203

(51) Int. Cl.
*G06F 15/00* (2006.01)
*G06F 3/12* (2006.01)
*H04N 1/00* (2006.01)

(52) U.S. Cl.
CPC .......... *G06F 3/1285* (2013.01); *G06F 3/1211* (2013.01); *G06F 3/1222* (2013.01); *G06F 3/1236* (2013.01); *G06F 3/1268* (2013.01); *H04N 1/00411* (2013.01); *H04N 2201/0094* (2013.01)

(58) Field of Classification Search
CPC .... G06F 3/1285; G06F 3/1211; G06F 3/1236; G06F 3/1222; G06F 3/1268; H04N 1/00411; H04N 2201/0094
USPC ................................................ 358/1.13–1.15
See application file for complete search history.

(56) References Cited

U.S. PATENT DOCUMENTS

| 2013/0222840 A1* | 8/2013 | Hosoda | H04N 1/00204 |
| | | | 358/1.14 |
| 2016/0165080 A1* | 6/2016 | Yamahata | H04N 1/00464 |
| | | | 358/1.15 |

FOREIGN PATENT DOCUMENTS

JP 2012-194618 A 10/2012

* cited by examiner

*Primary Examiner* — Saeid Ebrahimi Dehkordy
(74) *Attorney, Agent, or Firm* — Oliff PLC

(57) ABSTRACT

An image processing apparatus includes a reservation setting unit, an operation unit, and a setting controller. The reservation setting unit receives a process request reservation through a communication line from a terminal used by a first user, and sets a reserved state. The operation unit receives an operation input from a second user different from the first user. The setting controller applies control to allow the second user to perform, with the operation unit, an input operation of a setting item regarding a process request and a setting value of the setting item in the reserved state.

8 Claims, 5 Drawing Sheets

IMAGE PROCESSING APPARATUS AND METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-147203 filed Jul. 27, 2016.

BACKGROUND

(i) Technical Field

The present invention relates to an image processing apparatus and method, and a non-transitory computer readable medium.

(ii) Related Art

Hitherto, a system capable of transmitting a process request reservation for reserving a process performed on an image processing apparatus from a remote user interface (remote UI) such as a portable terminal used by a user (remote user) through a communication line has been available. According to the system, when the user makes in advance a process request reservation using the remote UI, at the time the user comes in front of the image processing apparatus, the user is able to immediately start a process according to the process request reservation if the remote user inputs an execution command for executing the process. In the above-described system, in a state where a process request reservation from the remote UI has been received (reserved state), for example, a user (local user) who wants to make a process request using an operation unit of the image processing apparatus and who is other than the remote user having transmitted the process request reservation may be restricted to perform an operation on the image processing apparatus.

A process request input to the image processing apparatus includes setting information indicating the settings of the process request. The setting information includes multiple setting values to be set for various setting items. For example, when a process request is a job for performing copying, the setting items include the settings of magnification, paper, color/monochrome, image quality, and double-sided/single-sided. When inputting a process request, a user is asked to determine various setting values, and it may take time to input the settings. In the case of facsimile transmission or scanned image transfer, a user is asked to search for and select or to input destination information on a transfer destination, which may also take time. Therefore, even when the image processing apparatus is in a reserved state, if the operation unit of the image processing apparatus is available, the local user may want to at least input the settings of a process request while maintaining the reserved state of the image processing apparatus.

SUMMARY

According to an aspect of the invention, there is provided an image processing apparatus including a reservation setting unit, an operation unit, and a setting controller. The reservation setting unit receives a process request reservation through a communication line from a terminal used by a first user, and sets a reserved state. The operation unit receives an operation input from a second user different from the first user. The setting controller applies control to allow the second user to perform, with the operation unit, an input operation of a setting item regarding a process request and a setting value of the setting item in the reserved state.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described.

First Exemplary Embodiment

Figure 1:
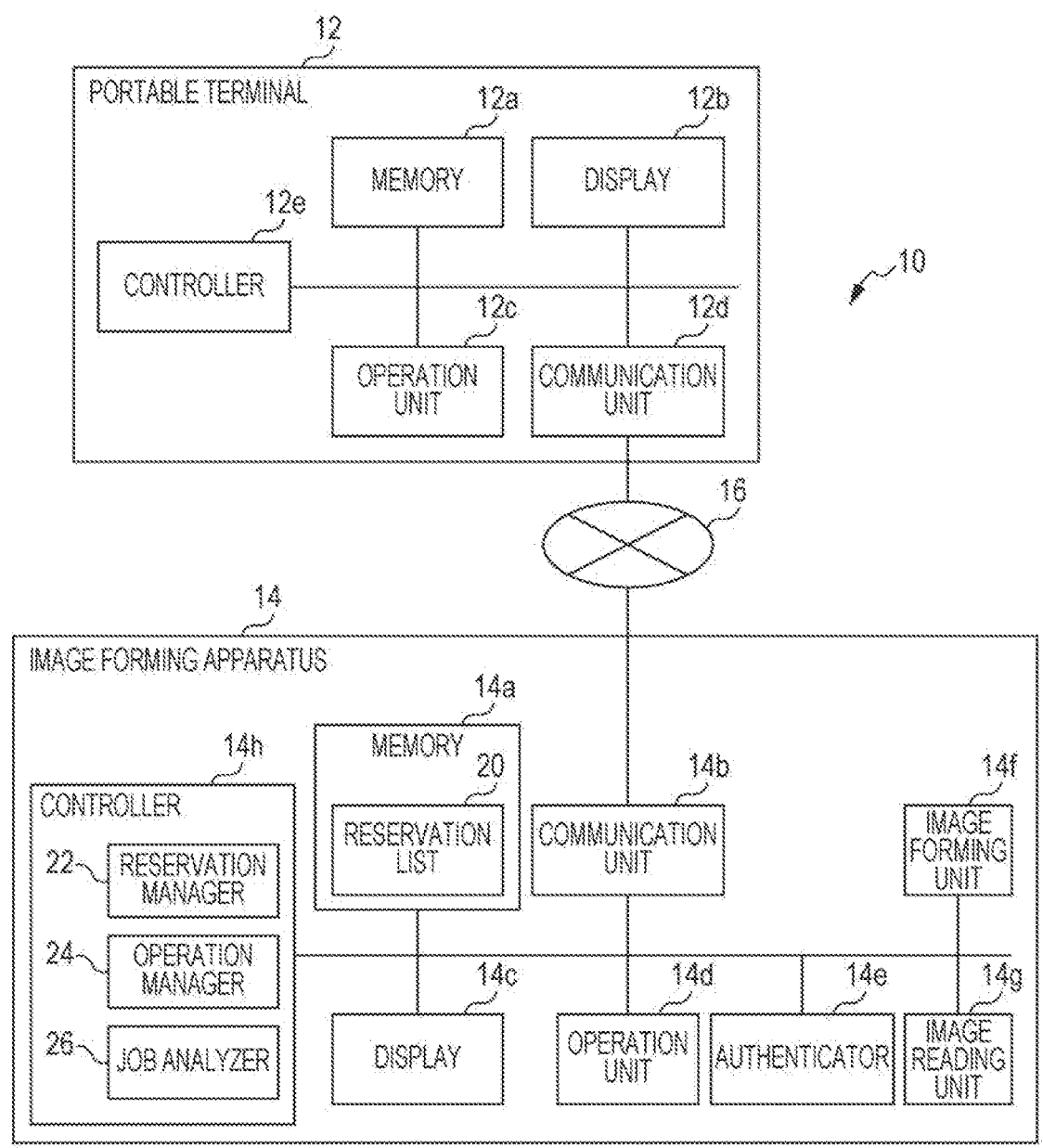
FIG. 1 is a schematic configuration diagram of a job processing system according to a first exemplary embodiment.

FIG. 1 schematically illustrates the configuration of a job processing system 10 according to a first exemplary embodiment. The job processing system 10 includes a portable terminal 12 used by a remote user serving as a first user, and an image forming apparatus 14 serving as an image processing apparatus. In the job processing system 10, the portable terminal 12 and the image forming apparatus 14 are connected to be capable of communicating with each other through a communication line 16 including the Internet or a wireless or wired local area network (LAN). Although only one portable terminal 12 is illustrated in FIG. 1, the image forming apparatus 14 is connectable to multiple portable terminals 12 in the job processing system 10.

The portable terminal 12 is used as a remote UI in the job processing system 10. Specifically, the image forming apparatus 14 has the function as a web server. A web browser operating on the portable terminal 12 is capable of logging in to and accessing the image forming apparatus 14 using the HyperText Transfer Protocol (HTTP). Accordingly, the image forming apparatus 14 transmits a job reservation screen to the portable terminal 12, and the remote user inputs settings regarding a job serving as a process request in accordance with the job reservation screen displayed on a display 12b of the portable terminal 12. Job reservation information including the input setting information is transmitted to the image forming apparatus 14 using the HTTP, and a job reservation serving as a process request reservation is received by the image forming apparatus 14. Accordingly, a reserved state is formed by the remote user on the image forming apparatus 14. After forming a reserved state on the image forming apparatus 14, the remote user comes in front of the image forming apparatus 14 and inputs an execution command for a job in the reserved state using the portable terminal 12 or an operation unit 14d (described later) of the image forming apparatus 14. Accordingly, a process according to the job in the reserved state is executed by the image forming apparatus 14.

Hereinafter, the configuration of the portable terminal 12 will be described. The portable terminal 12 functions as a remote UI, as described above. The portable terminal 12 is a portable terminal carried by the user, such as a smartphone or a tablet computer. Alternatively, a terminal that functions as a remote UI may be a desktop personal computer.

A memory 12a includes a read-only memory (ROM) or a random-access memory (RAM), for example. The memory 12a stores a program for causing the components of the portable terminal 12 to operate, or the result of processing performed by the portable terminal 12.

The display 12b includes a liquid crystal panel or the like, and displays various screens.

An operation unit 12c includes a touchscreen or buttons, for example. The operation unit 12c enables a user to input a command, such as the setting values of a job, to the portable terminal 12.

A communication unit 12d includes a wired or wireless LAN module or a cellular phone line communication module. The communication unit 12d enables communication with the communication line 16. The portable terminal 12 transmits/receives various items of information (data) to/from the image forming apparatus 14 using the HTTP through the communication unit 12d, as described above.

For example, the communication unit 12d transmits job reservation information for forming a reserved state on the image forming apparatus 14 to the image forming apparatus 14, as described above. The job reservation information includes a user identification (ID) for identifying a remote user who is reserving this job, a portable terminal ID for identifying the portable terminal 12, and job setting information indicating the details of the job. The job setting information may include information indicating the security level of the job. The job reservation information may include reservation start time information indicating the start time of a reservation time period and reservation end time information indicating the end time of the reservation time period. Note that the job reservation information includes interrupt approval information indicating whether a user (local user) other than a user who has transmitted the job reservation information is allowed to execute a job in the reserved state, which will be described later.

A controller 12e includes a microcomputer or the like, and controls the components of the portable terminal 12 in accordance with the program stored in the memory 12a.

Hereinafter, the configuration of the image forming apparatus 14 will be described. The image forming apparatus 14 is a multifunctional apparatus having multiple functions including a print function, a scan function, a copy function, and a facsimile function.

A memory 14a includes a ROM, a RAM, or a hard disk, for example. The memory 14a stores a program for causing the components of the image forming apparatus 14 to operate.

The memory 14a also stores apparatus setting information determining the operation of the image forming apparatus 14. Various initial settings of the image forming apparatus 14 may be set by the administrator (serviceman) of the image forming apparatus 14. Information on the initial settings set to the apparatus include, for example, a setting indicating whether to allow a local user to perform an operation in a reserved state, or, a setting indicating, when a local user performs an operation (particularly a job setting input operation) in a reserved state, whether to notify a remote user thereof.

The memory 14a stores a reservation list 20 serving as a list of jobs in a reserved state (reserved jobs) reserved on the image forming apparatus 14. In response to transmission of job reservation information from the portable terminal 12, a record indicating a reserved job according to the job reservation information is added to the reservation list 20. In the first exemplary embodiment, addition of a record to the reservation list 20 forms a reserved state. When job reservation information includes reservation start time information and reservation end time information, a reserved state is formed from the reservation start time to the reservation end time. A record indicating a reserved job includes a user ID for identifying a user having reserved the reserved job, a portable terminal ID for identifying the portable terminal 12 transmitting job reservation information according to the reserved job, job setting information indicating the details of the job, and reservation date and time information indicating a reservation date and time. When a process according to the reserved job is executed, a record indicating the reserved job is deleted from the reservation list 20.

Note that the memory 14a also stores web page data including a Hypertext Markup Language (HTML) file or an image file. The web page data is used when the image forming apparatus 14 functions as a web server.

A communication unit 14b includes a wired or wireless LAN module. The communication unit 14b enables communication with the communication line 16. The image forming apparatus 14 transmits/receives various items of information (data) to/from the portable terminal 12 through the communication unit 14b.

The communication unit 14b is also connected to a public network and exhibits a facsimile transmission function. According to the facsimile transmission function, an electronic file is transmittable via facsimile. In other words, the communication unit 14b realizes a facsimile function.

A display 14c includes a liquid crystal panel or the like. The display 14c displays various screens including a job input screen for a local user serving as a second user to input a job, and a screen indicating a list of reserved jobs reserved on the image forming apparatus 14.

The operation unit 14d serving as an operation unit receives an operation input from the local user or the remote user, and includes a touchscreen or buttons, for example. The operation unit 14d is for inputting a command from the local user or the remote user to the image forming apparatus 14.

An authenticator 14e includes a card reader or the like, and is used when a user logs in to the image forming apparatus 14. For example, the authenticator 14e reads the user ID of a user from an ID card held by the user, and collates the read user ID with a user database stored in the memory 14a or a server (not illustrated) connected to be capable of communicating with the image forming apparatus 14, thereby performing the log-in processing of the user. Alternatively, the authentication method employed by the authenticator 14e may be one that asks the user to input his/her user ID and password. When the ID of the authenticated user is included in the reservation list 20, the user may be treated as a remote user. When the ID of the authenticated user is not included in the reservation list 20, the user may be treated as a local user.

An image forming unit 14f includes a raster image processor (RIP) unit that expands image data specified by a print job that requests a print function into raster data, and an output unit that executes printing which represents the expanded raster data or image data read by a later-described image reading unit 14g on a print medium such as paper. In other words, the image forming unit 14f realizes a print function or a copy function.

The image reading unit 14g includes an image reading apparatus or the like, and obtains image data by reading an image on a print medium such as paper. The image reading unit 14g realizes a scan function or a copy function.

As described above, the communication unit 14b, the image forming unit 14f, and the image reading unit 14g function as an execution unit that executes a process according to a job.

A controller 14h includes a microcomputer or a central processing unit (CPU), for example, and controls the components of the image forming apparatus 14 in accordance with the program stored in the memory 14a. The controller 14h functions as a reservation manager 22 serving as a reservation setting unit, an operation manager 24 serving as a setting controller, and a job analyzer 26. Hereinafter, these functions realized by the controller 14h will be described.

The reservation manager 22 receives job reservation information transmitted from the portable terminal 12, and performs processing to add a record to the reservation list 20 on the basis of the job reservation information. Accordingly, a reserved state is formed on the image forming apparatus 14. Furthermore, when a process according to the reserved job is executed, the reservation manager 22 performs processing to delete a record indicating the reserved job from the reservation list 20. When all records are deleted from the reservation list 20, the reserved state is canceled.

The operation manager 24 controls whether to allow a user (particularly a local user) to perform an operation on the image forming apparatus 14. For example, when the image forming apparatus 14 is in a reserved state, the operation manager 24 refers to apparatus setting information stored in the memory 14a and, when there is a setting that prohibits a local user from performing an operation in a reserved state, the operation manager 24 prohibits a local user from performing an operation using the operation unit 14d. Alternatively, the later-described job analyzer 26 analyzes job reservation information and, when the security level of the reserved job is greater than a certain value, a local user is not allowed to perform an operation using the operation unit 14d. Specific processing to prohibit a local user from performing an operation includes, for example, ignoring any operation performed by a local user even when the local user operates the operation unit 14d, or, when the operation unit 14d includes a touchscreen, displaying no operation screen.

In the first exemplary embodiment, when a certain condition is satisfied, the operation manager 24 allows a local user to perform an operation on the image forming apparatus 14 even in a reserved state, particularly an operation to input the setting(s) of a job. This processing will be described in detail later.

The job analyzer 26 analyzes the details of a reserved job according to job reservation information transmitted from the portable terminal 12, or the details of a job input by a local user. For example, the job analyzer 26 analyzes various settings including a function (print, scan, copy, or facsimile) requested by a job and the security level of the job, and interrupt approval information.

Hereinafter, a process performed by the image forming apparatus 14 according to the first exemplary embodiment will be described in detail in accordance with the flowchart illustrated in FIG. 2.

In step S10, a remote user first activates a web browser on the portable terminal 12 and accesses the image forming apparatus 14 using the HTTP. The image forming apparatus 14, accessed by the portable terminal 12, transmits a job reservation screen for the remote user to input job setting information. The remote user inputs job setting information on the job reservation screen. For example, the job setting information may include selection of a function such as print, scan, copy, or facsimile, setting of values for items of an execution condition of the selected function, and a reservation date and time. The portable terminal 12 transmits job reservation information including the input job setting information to the image forming apparatus 14. On receipt of the job reservation information from the portable terminal 12, the reservation manager 22 adds a record to the reservation list 20 on the basis of the job reservation information. Accordingly, a reserved state is formed.

In step S12, the authenticator 14e performs the log-in processing of the local user. In the first exemplary embodiment, the log-in processing is performed by having the local user hold his/her ID card over the card reader. In this processing, when the ID of the authenticated user is not included in the reservation list 20, the authenticator 14e performs log-in processing where the user is recognized as a local user. Alternatively, the user may input that he/she is a local user using the operation unit 14d, or the user may select a function setting input using the operation unit 14d on the basis of a menu screen displayed on the display 14c, and accordingly the user may be recognized as a local user.

In step S14, the operation manager 24 determines whether a local user is allowed to perform an operation in a reserved state. Specifically, the operation manager 24 refers to apparatus setting information stored in the memory 14a, and determines whether the image forming apparatus 14 includes a setting that allows a local user to perform an operation in a reserved state. When the job analyzer 26 analyzes the job reservation information received in step S10 and determines that the security level of the reserved job is greater than a certain value, the operation manager 24 determines that a local user is not allowed to perform an operation in a reserved state.

When the operation manager 24 determines in step S14 that a local user is not allowed to perform an operation in a reserved state, the process proceeds to step S32. In other words, the local user waits until the reserved state is canceled, that is, execution of the reserved job is completed, and then inputs a job. At this time, the display 14c may display a message such as "The apparatus is not allowed to be used unless you have made a reservation". Alternatively, a reservation list screen indicating the details of the reservation list 20 may be displayed. When the operation manager 24 determines in step S14 that a local user is allowed to perform an operation in a reserved state, the process proceeds to step S16.

In step S16, the job analyzer 26 analyzes the job reservation information received in step S10, particularly a function requested by the reserved job, thereby identifying one or more functions simultaneously executable with the reserved job, among the functions (processing details) included in the image forming apparatus 14. This identifying process is performed on the basis of resources (hardware resources) as an execution unit for realizing a function requested by the reserved job. For example, when the reserved job requests a print function realized by the image forming unit 14f, the job analyzer 26 identifies that a scan function and a facsimile transmission function that are functions realized by the image reading unit 14g are functions simultaneously executable with the reserved job. When the reserved job requests a print function realized by the image forming unit 14*f*, the job analyzer 26 identifies that a print function and a copy function realized by the image forming unit 14*f* are functions that are not simultaneously executable with the reserved job.

The controller 14*h* displays the function(s) identified by the job analyzer 26 on the display 14*c* serving as a display. For example, the message "The apparatus is already reserved; only a scan function is executable." is displayed. When the analysis of the job analyzer 26 indicates that there is no function simultaneously executable with the reserved job, the controller 14*h* displays a message indicating this on the display 14*c*. For example, the message "The apparatus is reserved; only a job setting input is allowed." is displayed.

Figure 3:
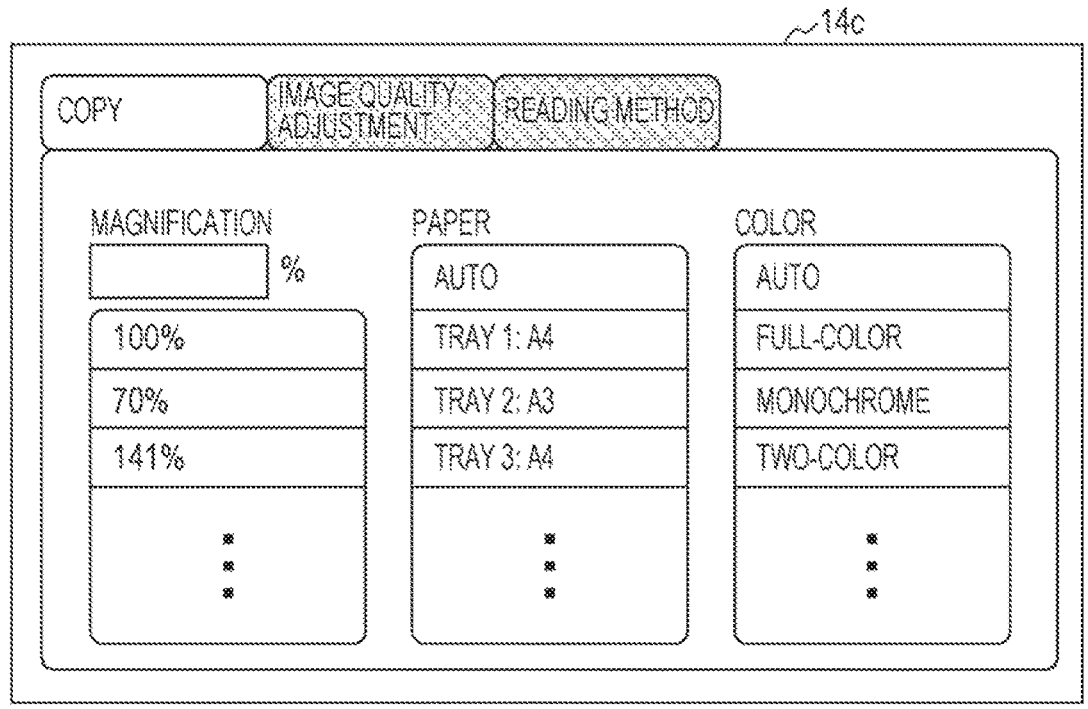
FIG. 3 illustrates an example of a job setting input screen.

In step S18, the operation manager 24 displays a job setting input screen on the display 14*c*. The local user inputs a job setting(s) on the displayed job setting input screen. Hereinafter, the local user's job is referred to as a local job for the sake of convenience. FIG. 3 illustrates an example of the job setting input screen when a copy function is selected. On the job setting input screen, items such as magnification, paper, and color/monochrome and values regarding these items are input as settings. On a screen displayed in response to touching an image quality adjustment tab, settings regarding the image quality, such as the document image quality, copy density, sharpness, saturation, and color balance, are input. Furthermore, on a screen displayed in response to touching a reading method tab, settings such as double-sided/single-sided setting and N-up setting (copy setting for organizing multiple documents on one sheet of paper) are input. In this way, the local user inputs setting values for various setting items.

Therefore, it may take great time to input the job settings. When the local job setting input is completed, the local user presses an "end setting button" included in the job setting input screen to end the setting input processing.

Referring back to FIG. 2, in step S20, the controller 14*h* refers to the apparatus setting information and, when the local user performs a job setting input operation in the reserved state, determines whether there is a setting that notifies the remote user thereof. When there is a setting that notifies the remote user thereof, the operation will be described later in accordance with the flowchart illustrated in FIG. 5. Here, it is assumed that there is no such setting, and the process proceeds to step S22.

In step S22, the job analyzer 26 analyzes the reserved job received in step S10 and the local job input in step S18, and determines whether the two jobs are simultaneously executable.

This determination is performed by determining whether resources serving as an execution unit for realizing the functions requested by the reserved job and the local job compete with (overlap) each other. For example, when one of the reserved job and the local job is a print job that requests a print function realized by the image forming unit 14*f*, and the other is a scan job that requests a scan function realized by the image reading unit 14*g*, it is determined that the two jobs are simultaneously executable. In contrast, when one of the reserved job and the local job is a print job and the other is a copy job that requests a copy function realized by the image forming unit 14*f* and the image reading unit 14*g*, it is determined that the two jobs are not simultaneously executable.

This determination is performed on the basis of interrupt approval information included in the job reservation information. When the interrupt approval information indicates that the interrupt execution of a local job is refused, the job analyzer 26 determines that simultaneous execution of the reserved job and the local job is unfeasible.

When it is determined in step S22 that simultaneous execution of the reserved job and the local job is feasible, the process proceeds to step S24. In step S24, the operation manager 24 displays, on the display 14*c*, an execution command input screen for inputting a command to execute a process according to the local job. On the execution command input screen, for example, the message "The job setting is completed; the set job is executable." is displayed. Along with the message, a start button for the local user to input a command to execute a process according to the local job is displayed.

When the execution command is input in step S24, in step S26, execution of the local job starts.

When it is determined in step S22 that simultaneous execution of the reserved job and the local job is unfeasible, the process proceeds to step S28. In step S28, the controller 14*h* stores job setting information indicating the job setting(s) of the local job, input in step S18, in the memory 14*a* serving as a memory. Moreover, the controller 14*h* may display, on the display 14*c*, a setting end screen notifying the local user that the job setting is ended. On the setting end screen, for example, the message "The job setting is ended; the set job can be read out the next time you log in." is displayed. When the processing end time of the reserved job may be estimated by the analysis of the reserved job by the job analyzer 26, information indicating the end time may be additionally displayed.

Figure 4:
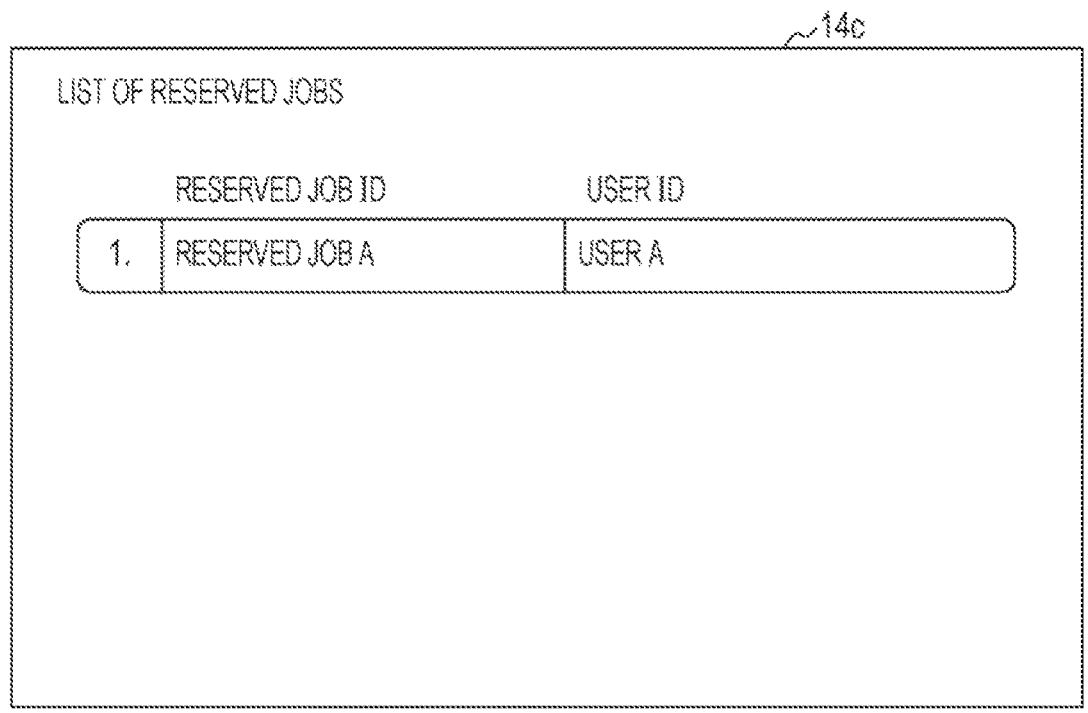
FIG. 4 illustrates an example of a reservation list screen.

In step S30, the controller 14*h* displays, on the display 14*c*, a reservation list screen indicating the details of the reservation list 20. FIG. 4 illustrates an example of the reservation list screen. As illustrated in FIG. 4, a reserved job ID for identifying a reserved job, a user ID indicating a user who has transmitted the reserved job, and the like are displayed on the reservation list screen. This enables the local user to grasp the number of reserved jobs reserved on the image forming apparatus 14.

In step S32, the remote user comes in front of the image forming apparatus 14 and performs log-in processing to log in to the image forming apparatus 14. The log-in processing may be performed with the same processing as that of the local user.

When the remote user logs in to the image forming apparatus 14, in step S34, the controller 14*h* displays a setting confirmation screen regarding the reserved job according to the remote user. On the setting confirmation screen, setting values for setting items indicated by the job setting information included in the job reservation information transmitted by the remote user are displayed. On the setting confirmation screen, the remote user may be allowed to modify or re-input the job setting(s). On the setting confirmation screen, a start button for inputting a command to execute a process according to the reserved job is displayed.

In response to pressing of the start button included in the setting confirmation screen, in step S36, execution of the process according to the reserved job starts. When the process according to the local job is still running at the time of step S36, the process according to the local job and the process according to the reserved job are simultaneously executed. When it is determined in step S22 that simultaneous execution of the reserved job and the local job is unfeasible, the local user again logs in to the image forming apparatus 14 and inputs the execution command after the process of the reserved job ends, thereby executing the process according to the local job.

Figure 5:
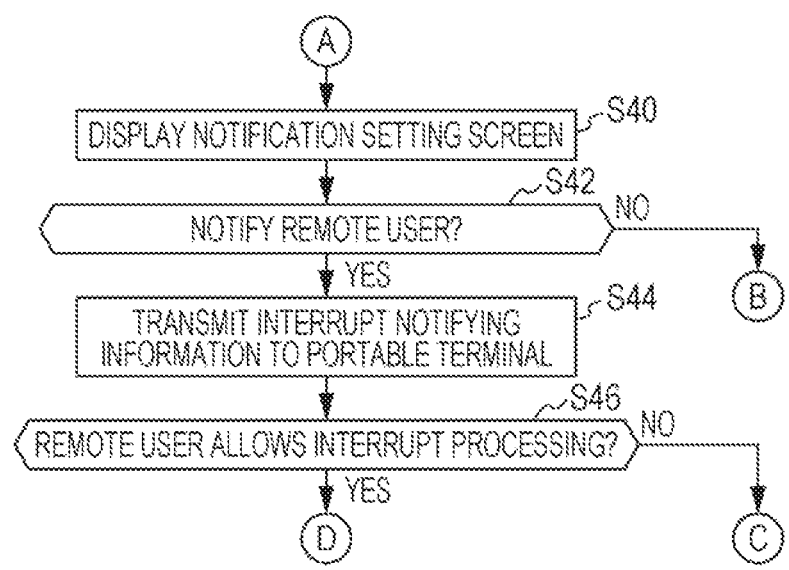
FIG. 5 is a second flowchart illustrating the flow of a process performed by the image processing apparatus according to the first exemplary embodiment.

Hereinafter, the case where there is a setting that notifies the remote user in step S20 will be described with reference to FIGS. 2 and 5. When there is a setting that notifies the remote user in step S20, the process proceeds to step S40 in FIG. 5.

In step S40, the controller 14h asks the local user to execute a notification process of notifying the remote user, who has transmitted the job reservation information, of the fact that a local job has been input, and asking the remote user whether the local job is allowed to be executed. Specifically, a notification setting screen for the local user to select whether to execute the notification process is displayed on the display 14c. For example, the message "Do you want to notify and ask the remote user who has made a reservation for execution approval?" is displayed. Along with the message, a "yes" button and a "no" button for the local user to input a command are displayed.

In step S42, it is determined whether the local user has allowed to notify the remote user. For example, when the "yes" button is pressed on the notification setting screen, it is determined that the local user has allowed to notify the remote user, and the process proceeds to step S44. When the "no" button is pressed on the notification setting screen, it is determined that the local user has not allowed to notify the remote user, the process proceeds to step S22 in FIG. 2, and the processing from step S22 onward is performed.

In step S44, the controller 14h transmits interrupt notifying information to the portable terminal 12. The interrupt notifying information includes the setting details of the local job and the user ID of the local user. On the basis of the received interrupt notifying information, the portable terminal 12 displays, on the display 12b, an interrupt confirmation screen for the remote user to check whether to allow the interrupt processing of the local job. On the interrupt confirmation screen, for example, the message "The local user has sent you a notification asking whether you allow the local user to first execute the local job. Do you approve this request?" is displayed along with the setting details of the local job and the user ID of the local user. Along with the message, an "approve" button and a "refuse" button for the remote user to input a command are displayed. Here, when the remote user presses the "approve" button, the portable terminal 12 transmits an interrupt approval signal to the image forming apparatus 14. When the remote user presses the "refuse" button, the portable terminal 12 transmits an interrupt refusal signal to the image forming apparatus 14.

In step S46, the controller 14h determines whether the remote user has allowed the interrupt processing of the local job. Specifically, it is determined that the remote user has allowed the interrupt processing of the local job when an interrupt approval signal is received from the portable terminal 12, the process proceeds to step S24 in FIG. 2, and the processing from step S24 onward is performed. In contrast, it is determined that the remote user has not allowed the interrupt processing of the local job when an interrupt refusal signal is received from the portable terminal 12, the process proceeds to step S28 in FIG. 2, and the processing from step S28 onward is performed.

According to the first exemplary embodiment described above, even when the image forming apparatus 14 is in a reserved state, a local user is allowed to input the setting(s) of a local job while the reserved state is maintained. In other words, a local user is allowed to input the setting(s) of a local job, which takes great time, during a reserved state.

When a remote user's reserved job and a local job are not simultaneously executable, or when a remote user has refused the interrupt processing of a local job, that is, when a reserved job is to be processed first, the already-input setting information of a local job is stored in the memory 14a. Accordingly, after a process according to the reserved job is completed, the local user may read out the stored setting information and execute the local job. Accordingly, it is no longer necessary to input the setting(s) of a local job after a process according to a reserved job is completed, and the time taken until execution of a process according to a local job starts is reduced.

Preferably, a function(s) simultaneously executable with a reserved job is displayed on the display 14c before a local user inputs the setting(s) of a local job. This enables the local user to grasp the function(s) simultaneously executable with a reserved job before inputting the setting(s).

Second Exemplary Embodiment

Because the schematic configuration of the job processing system 10 according to a second exemplary embodiment is equivalent to the job processing system 10 according to the first exemplary embodiment, a detailed description thereof will be omitted. Note that part of the configuration according to the second exemplary embodiment is added with functions, which will be described below.

The communication unit 14b of the image forming apparatus 14 included in the job processing system 10 according to the second exemplary embodiment may further function as a user detector that detects that there is a user (particularly a remote user) within a certain range from the image forming apparatus 14. For example, the communication unit 14b may include an information transmitter based on the Bluetooth (registered trademark) protocol, which periodically and continuously transmits unique information (such as the ID of the image forming apparatus 14) to a certain range from the image forming apparatus 14, and the portable terminal 12 may include an information receiver based on the Bluetooth protocol. In this configuration, if the portable terminal 12 is configured to transmit a confirmation signal to the image forming apparatus 14 on receipt of information transmitted from the image forming apparatus 14, the image forming apparatus 14 is able to detect, on the basis of reception of the confirmation signal, that the portable terminal 12 is within the certain range from the image forming apparatus 14. Having detected the portable terminal 12 may be considered that there is a remote user who uses the portable terminal 12 within the certain range from the image forming apparatus 14. Instead of using Bluetooth as the communication method, the communication unit 14b of the image forming apparatus 14 may include a WiFi module, which transmits a certain output amount of radio waves, and the portable terminal 12 receives the WiFi radio waves. Accordingly, the portable terminal 12 may transmit a confirmation signal to the image forming apparatus 14 on receipt of information transmitted from the image forming apparatus 14.

The user detector may have other configurations. For example, the image forming apparatus 14 may be provided with a human sensor to detect a remote user. Alternatively, each of the image forming apparatus 14 and the portable terminal 12 may be equipped with a Global Positioning System (GPS) receiver for obtaining its position information, and, on the basis of comparison of the position information detected by the GPS receivers of the portable terminal 12 and the image forming apparatus 14, it may be considered that that there is a remote user within a certain range from the image forming apparatus 14.

In the second exemplary embodiment, when a local user is allowed to perform an operation on the image forming apparatus 14 in a reserved state and when the above-mentioned user detector detects a remote user, the display 14*c* of the image forming apparatus 14 also functions as a warning output unit that outputs a warning notifying the local user that the remote user is approaching.

Specifically, the display 14*c* displays, for example, "A remote user is approaching." when the user detector detects a remote user. The warning output unit may have other configurations. For example, the local user may be notified using sound that a remote user is approaching.

Figure 6:
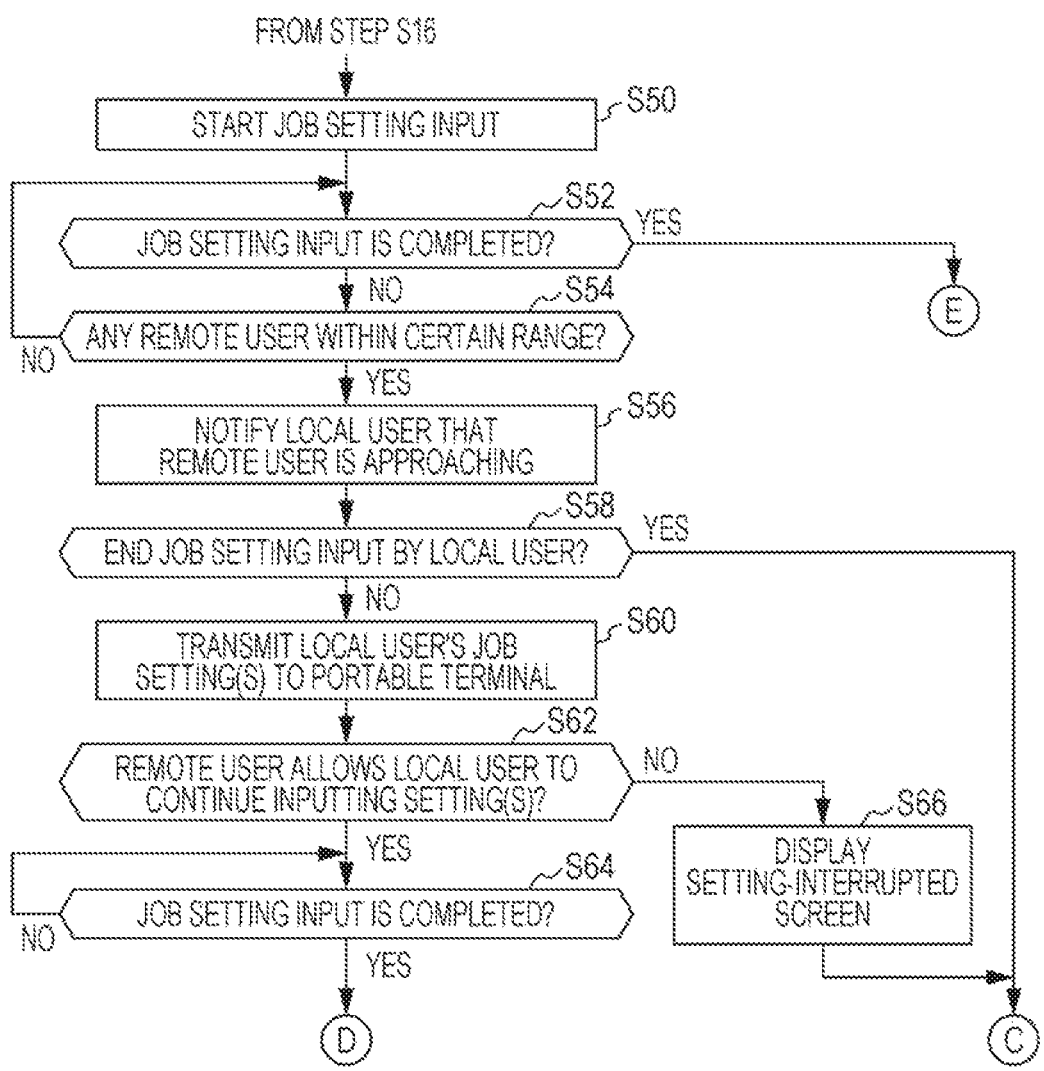
FIG. 6 is a flowchart illustrating the flow of a process performed by an image processing apparatus according to a second exemplary embodiment.

Hereinafter, a process performed by the job processing system 10 according to the second exemplary embodiment will be described in detail in accordance with the flowcharts illustrated in FIGS. 2 and 6.

Figure 2:
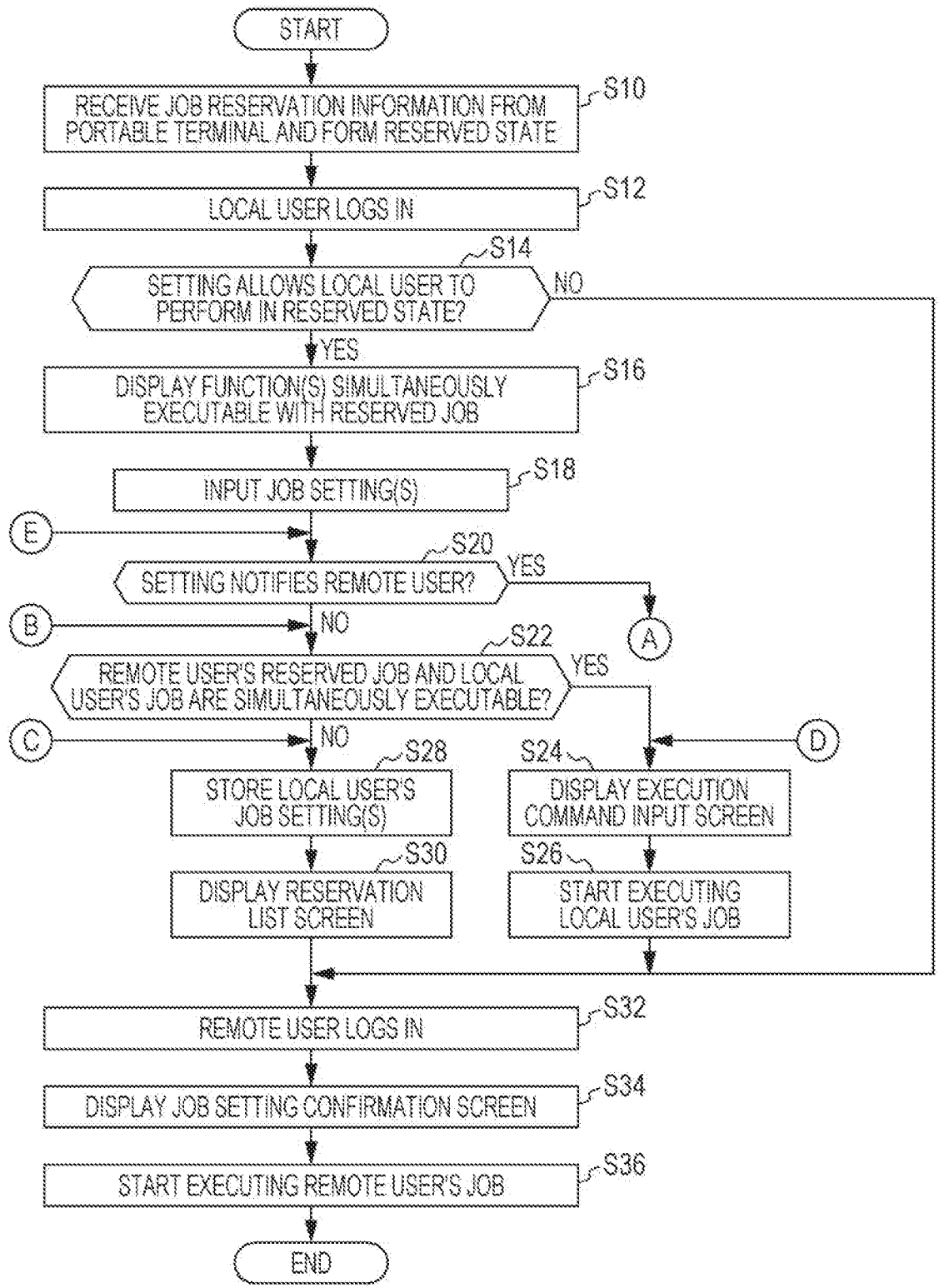
FIG. 2 is a flowchart illustrating the flow of a process performed by an image processing apparatus according to the first exemplary embodiment.

Because the flow of a process according to the second exemplary embodiment is the same as that according to the first exemplary embodiment from steps S10 to S16 in FIG. 2, a detailed description thereof will be omitted. In the second exemplary embodiment, the process proceeds to step S50 in FIG. 6 after the processing in step S16 ends.

In step S50, the operation manager 24 displays a job setting input screen on the display 14*c*, like step S18 in FIG. 2. The local user inputs the job setting(s) of a local job on the displayed job setting input screen.

In step S52, the controller 14*h* determines whether the process of inputting the setting(s) of the local job is completed. Specifically, whether the "end setting button" included in the job setting input screen is pressed is determined. When the process of inputting the job setting(s) is completed, the process proceeds to step S20 in FIG. 2, and the above-described processing from step S20 onward is performed.

When the process of inputting the job setting(s) is still under way, the controller 14*h* determines in step S54 whether there is a remote user who has transmitted the job reservation information in step S10 within a certain range from the image forming apparatus 14. Specifically, in the second exemplary embodiment, when the communication unit 14*b* receives a confirmation signal from the portable terminal 12 used by the remote user, it is determined that there is the remote user within the certain range from the image forming apparatus 14. When the remote user is not within the certain range, the process returns to step S52. In other words, while the local user is inputting the job setting(s), it is repeatedly determined whether there is the remote user within the certain range. When the remote user is detected within the certain range, the process proceeds to step S56.

In step S56, a process of notifying (warning) the local user that the remote user is approaching is executed. In the second exemplary embodiment, the controller 14*h* displays, on the display 14*c*, a message indicating that the remote user is approaching. For example, the message "A user who has made a reservation will arrive soon, and the setting may be interrupted; do you want to end the setting?" is displayed. Along with the message, an "end setting" button and a "continue setting" button are displayed for the local user to input a command whether to end the process of inputting the job setting(s) of the local job are displayed.

In step S58, the controller 14*h* determines whether the local user ends the process of inputting the setting(s) of the local job. In the second exemplary embodiment, the job setting inputting process is ended when the "end setting" button is pressed, the process proceeds to step S28 in FIG. 2, and the above-described processing from step S28 onward is performed. When the "continue setting" button is pressed, it is determined to continue the job setting inputting process, and the process proceeds to step S60.

In step S60, the controller 14*h* transmits local job setting information indicating the input job setting(s) of the local job to the portable terminal 12 detected in step S54. The controller 12*e* of the portable terminal 12, which has received the local job setting information, displays the local job setting(s) on the display 12*b*. Accordingly, the remote user is able to grasp the details of the local job (such as a function to be used). Moreover, an "approve continuation of job setting" button and a "refuse continuation of job setting" button for the remote user to input whether to allow continuation of the process of inputting the job setting(s) of the local job are displayed. Here, when the remote user presses the "approve continuation of job setting" button, the portable terminal 12 transmits a setting continuation approval signal to the image forming apparatus 14. Alternatively, when the remote user presses the "refuse continuation of job setting" button, the portable terminal 12 transmits a setting continuation refusal signal to the image forming apparatus 14.

In step S62, the controller 14*h* determines whether the remote user has allowed the local user to continue the process of inputting the job setting(s) of the local job. In the second exemplary embodiment, when the setting continuation approval signal is received from the portable terminal 12, it is determined that the remote user has allowed the local user to continue the process of inputting the setting(s) of the local job, and the process proceeds to step S64.

In step S64, like step S52, the controller 14*h* determines whether the process of inputting the setting(s) of the local job is completed. When it is determined that the job setting inputting process is completed, the process proceeds to step S24 in FIG. 2, and the processing from step S24 onward is performed.

In contrast, in step S62, when the setting continuation refusal signal is received from the portable terminal 12, it is determined that the remote user has not allowed the local user to continue the process of inputting the setting(s) of the local job, and the process proceeds to step S66.

In step S66, the controller 14*h* interrupts the process of inputting the setting(s) of the local job, and displays, on the display 14*c*, a setting-interrupted screen for notifying the local user of the interruption of the process. On the setting-interrupted screen, for example, the message "A remote user who has made a reservation has arrived, and the setting is interrupted." is displayed. Alternatively, when the processing end time of the reserved job may be estimated by the analysis of the reserved job by the job analyzer 26, information indicating the end time may be additionally displayed.

After the setting-interrupted screen is displayed in step S66, the process proceeds to step S28 in FIG. 2, and the processing from step S28 onward is performed.

As has been described above, according to the second exemplary embodiment, while a local user is inputting the job setting(s) of a local job in a reserved state, when a remote user approaches the image forming apparatus 14, a warning is output to notify the local user that the remote user is approaching. Accordingly, the local user is able to end the process of inputting the job setting(s) before the remote user arrives at the image forming apparatus 14 such that the remote user will be able to perform the processing first. Alternatively, if the local user wants to continue the setting process by any means, the local user may ask the remote user whether the local user is allowed to continue the job setting process before the remote user arrives at the image forming apparatus 14.

The exemplary embodiments of the present invention have been described above. However, the present invention is not limited to the above-described embodiments, and various changes may be made without departing from the spirit of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a reservation setting unit, implemented by one or more processors, that receives a process request reservation for performing a function of an image processing apparatus through a communication line from a terminal used by a first user, and sets a reserved state of the image processing apparatus based on the process request reservation;
an operation unit, implemented by the one or more processors, that receives an operation input from a second user different from the first user;
a setting controller, implemented by one or more processors, that:
determines whether the image processing apparatus should allow the second user to perform, via the operation unit, an input operation of a setting item regarding a process request and a setting value of the setting item while the image processing apparatus is in the reserved state, and
controls the image processing apparatus to allow or disallow the second user to perform the input operation of the setting item based on the determination while the image processing apparatus is in the reserved state; and
a memory that stores setting information according to the process request reservation received at the image processing apparatus from the second user when a process according to the process request reservation and a process according to the process request reservation received from the second user are not simultaneously executable.

2. The image processing apparatus according to claim 1, further comprising:
a display that displays that the second user is allowed to perform, with the operation unit, an input operation of a setting item regarding a process request and a setting value of the setting item in the reserved state.

3. The image processing apparatus according to claim 2, wherein the display displays details of a process simultaneously executable with a process according to the process request reservation, on the basis of details of the process request reservation.

4. The image processing apparatus according to claim 3, further comprising:

a user detector that detects that there is the first user within a certain range from the image processing apparatus; and
a warning output unit, implemented by the one or more processors, that outputs a warning to the second user who is performing the input operation when the user detector detects the first user within the certain range.

5. The image processing apparatus according to claim 2, further comprising:
a user detector that detects that there is the first user within a certain range from the image processing apparatus; and
a warning output unit, implemented by the one or more processors, that outputs a warning to the second user who is performing the input operation when the user detector detects the first user within the certain range.

6. The image processing apparatus according to claim 1, further comprising:
a user detector that detects that there is the first user within a certain range from the image processing apparatus; and
a warning output unit, implemented by the one or more processors, that outputs a warning to the second user who is performing the input operation when the user detector detects the first user within the certain range.

7. An image processing method comprising:
receiving, at an image processing apparatus, a process request reservation for performing a function of an image processing apparatus through a communication line from a terminal used by a first user, and setting a reserved state of the image processing apparatus based on the process request reservation;
receiving, at the image processing apparatus, an operation input from a second user different from the first user;
determining whether the image processing apparatus should allow the second user to perform, via an operation unit of the image processing apparatus, an input operation of a setting item regarding a process request and a setting value of the setting item while the image processing apparatus is in the reserved state;
controlling the image processing apparatus to allow or disallow the second user to perform the input operation of the setting item based on the determination while the image processing apparatus is in the reserved state; and
storing setting information according to the process request reservation received at the image processing apparatus from the second user when a process according to the process request reservation and a process according to the process request reservation received from the second user are not simultaneously executable.

8. A non-transitory computer readable medium storing a program causing a computer to execute a process, the process comprising:
receiving, at an image processing apparatus, a process request reservation through a communication line from a terminal used by a first user, and setting a reserved state of the image processing apparatus based on the process request reservation;
receiving, at the image processing apparatus, an operation input from a second user different from the first user;
determining whether the image processing apparatus should allow the second user to perform, via an operation unit of the image processing apparatus, an input operation of a setting item regarding a process request and a setting value of the setting item while the image processing apparatus is in the reserved state;

controlling the image processing apparatus to allow or disallow the second user to perform the input operation of the setting item based on the determination while the image processing apparatus is in the reserved state; and
storing setting information according to the process request reservation received at the image processing apparatus from the second user when a process according to the process request reservation and a process according to the process request reservation received from the second user are not simultaneously executable.

* * * * *